INVENTOR.
MARVIN G. COMBES
BY Gregg & Stidham
ATTORNEYS

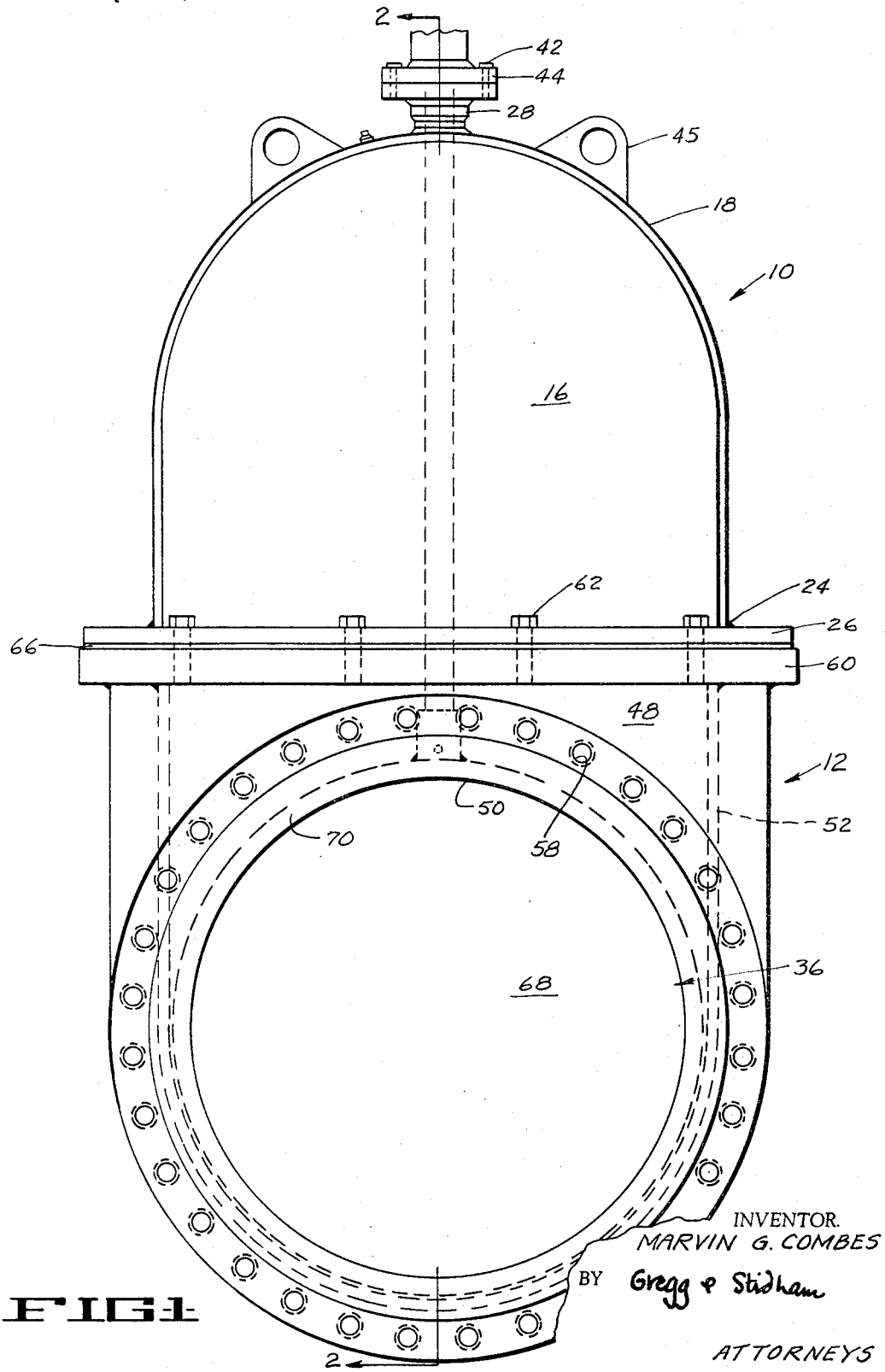

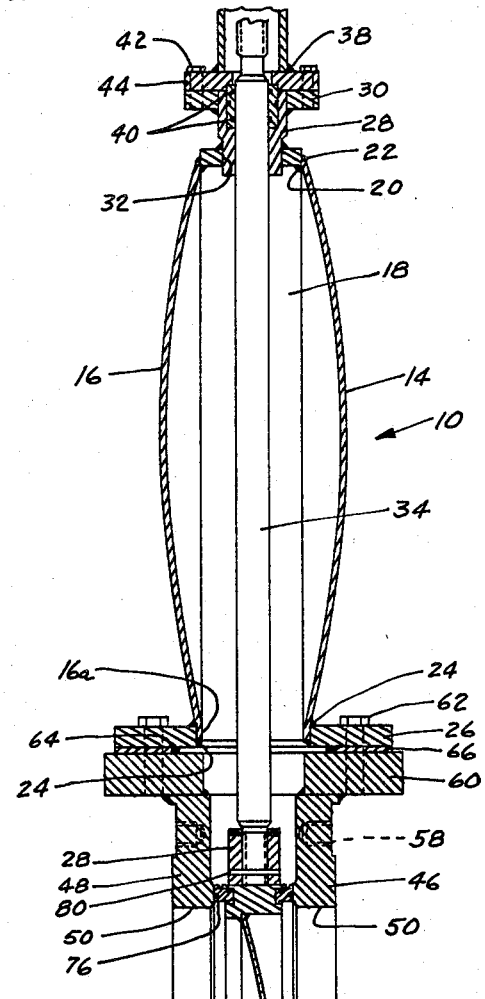
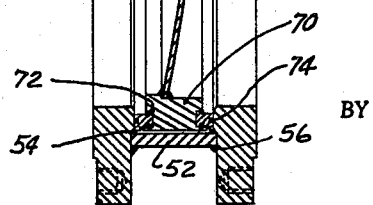
INVENTOR.
MARVIN G. COMBES
BY Gregg & Stidham
ATTORNEYS

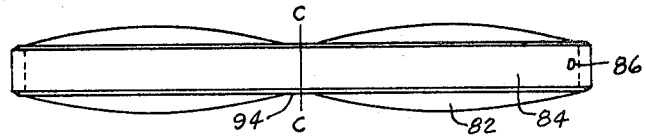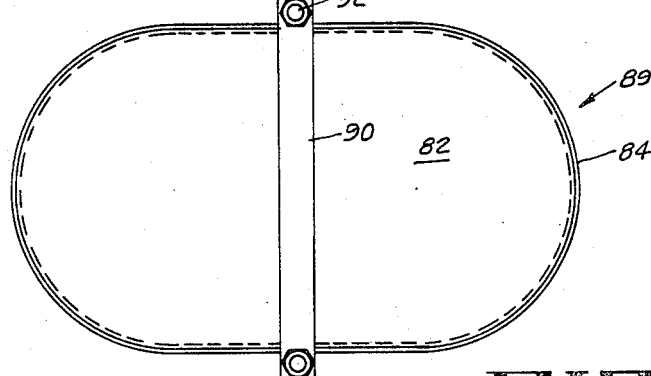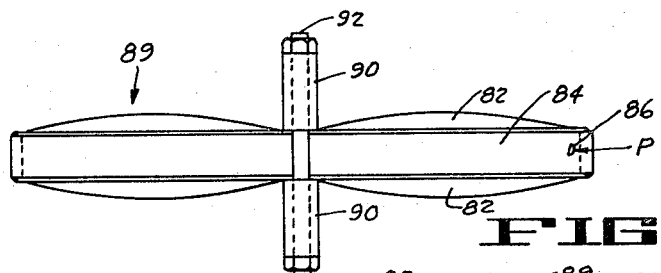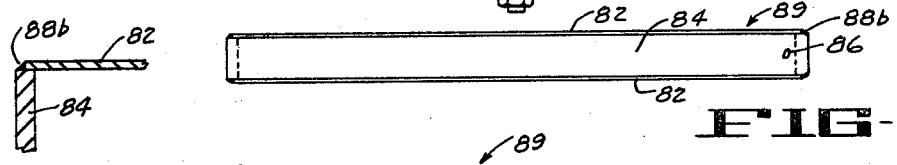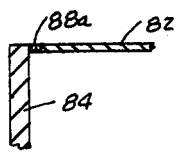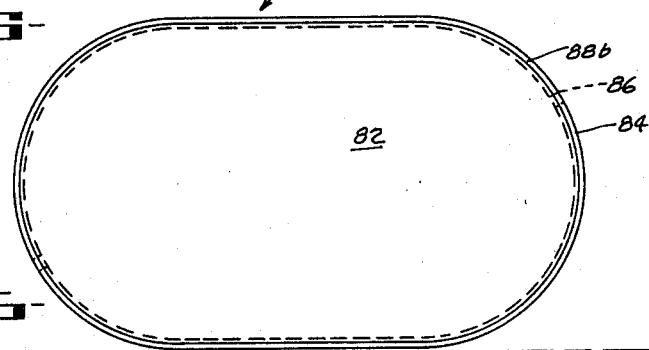

June 4, 1968
M. G. COMBES
3,386,151
VALVE CONSTRUCTION METHOD
Filed Sept. 14, 1965
7 Sheets-Sheet 5
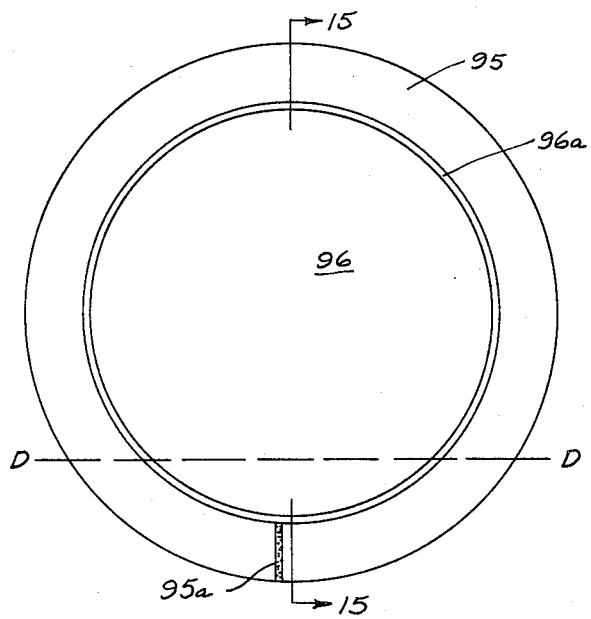
FIG 14
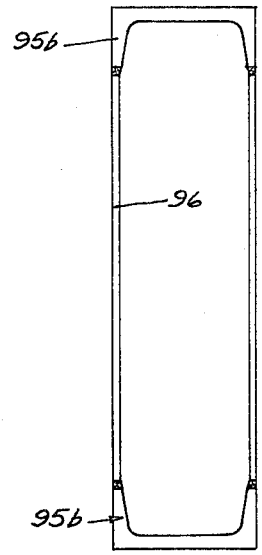
FIG 15
FIG 17
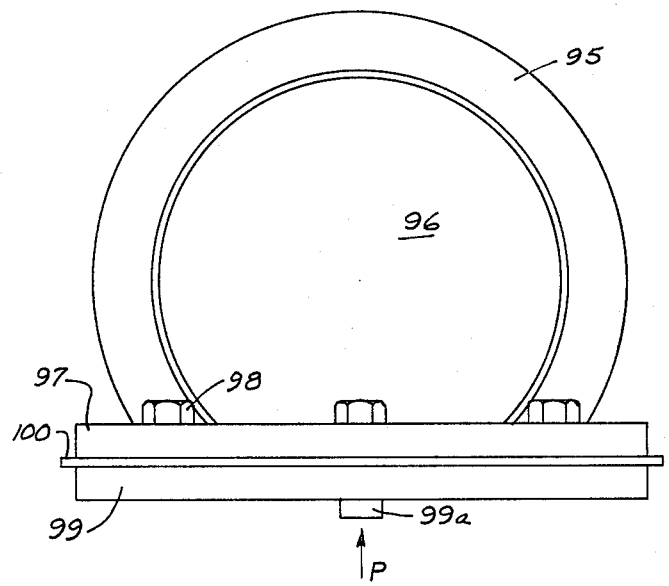
FIG 16
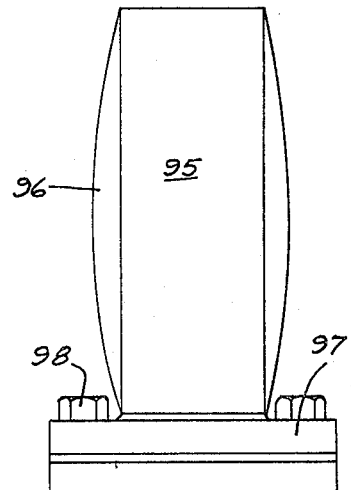
INVENTOR.
MARVIN G. COMBES
BY Gregg & Stidham
ATTORNEYS

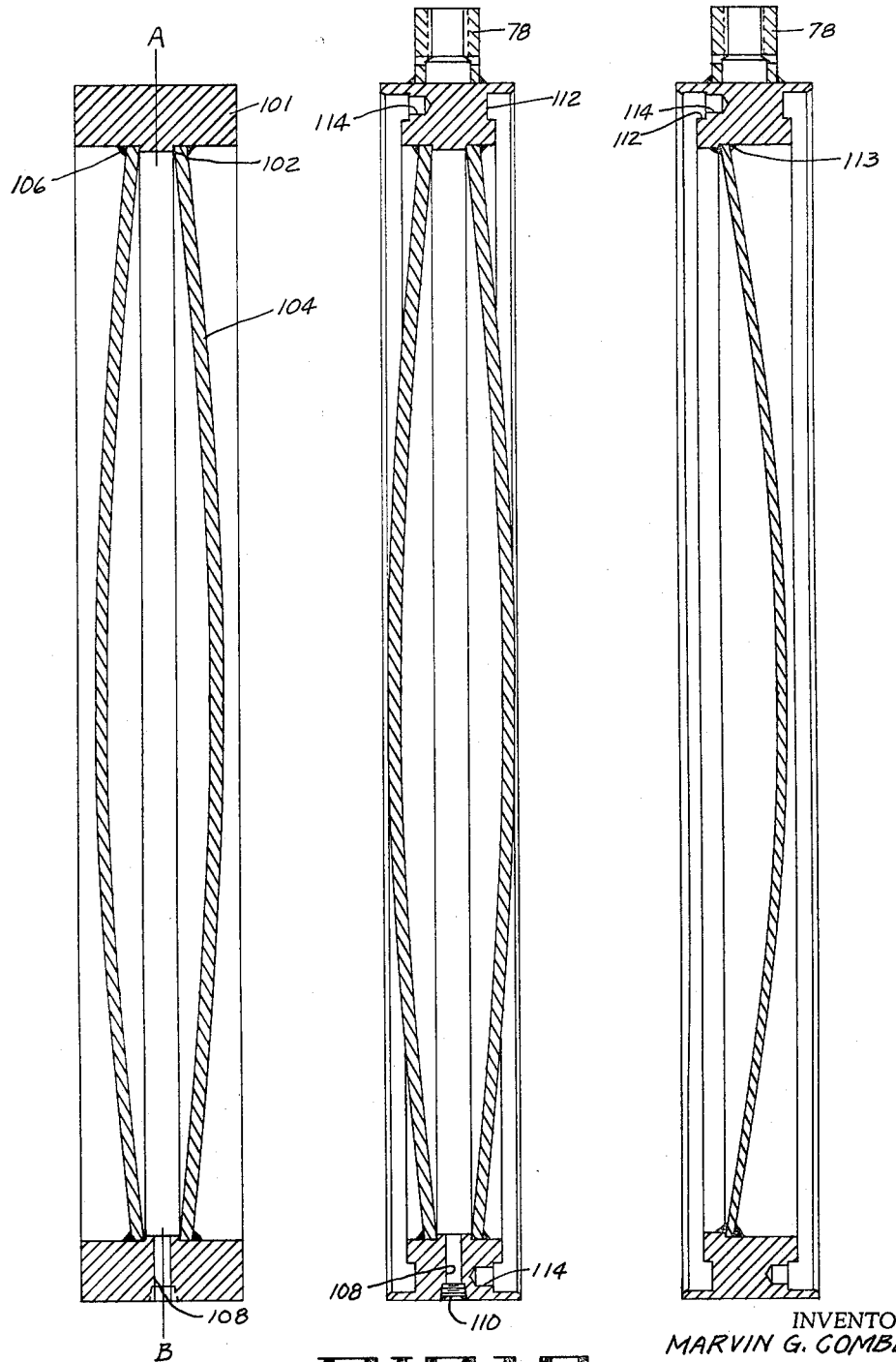

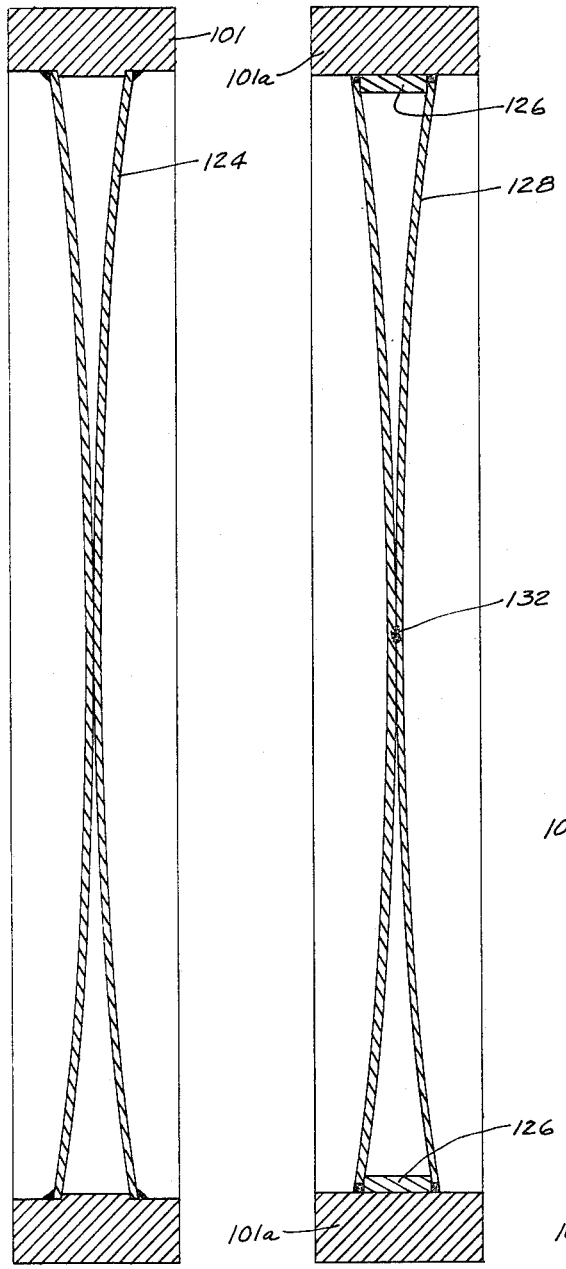
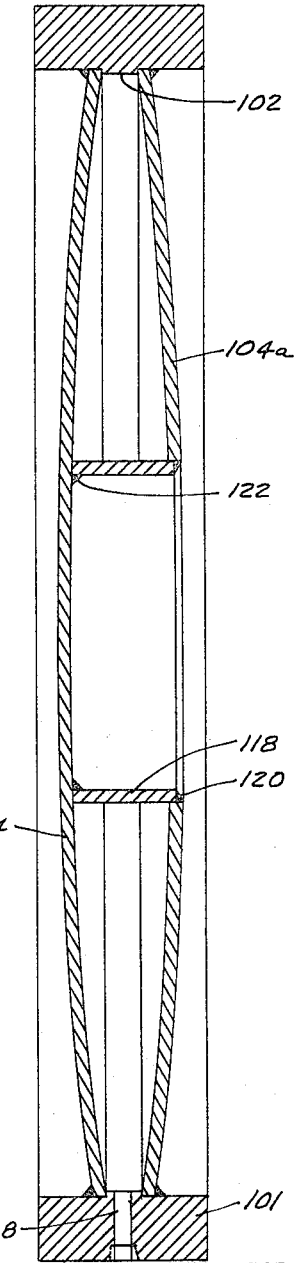

United States Patent Office 3,386,151
Patented June 4, 1968

3,386,151
VALVE CONSTRUCTION METHOD
Marvin G. Combes, Castro Valley, Calif., assignor to Grove Valve and Regulator Company, Oakland, Calif., a corporation of California
Filed Sept. 14, 1965, Ser. No. 487,265
13 Claims. (Cl. 29—157.1)

ABSTRACT OF THE DISCLOSURE

Constructing a valve body by forming an enclosure of thin metal with opposing walls and a band between them, and making it fluid tight by peripheral welding. The enclosure is expanded outward by a pressure fluid and is then severed, forming an open end body section. A complementary body section with flow passages is formed of thick material to withstand pipe line forces, and the two sections are joined as by welding each to a flange and sealing the flanges together.

A rigid member with an opening of a width corresponding to the flange opening is secured around the enclosure before expanding it to insure fit.

---

This invention relates to a valve construction method, and more particularly, to a method of manufacturing a low pressure pipeline valve by extensive use of lightweight relatively thin material.

Conventional valve structures, the bodies of which are cast, or are fabricated from metal plates, are commonly made with wall thicknesses adequate to withstand internal pressures substantially in excess of pressures actually encountered in many installations. Some gate valves or the like are designed for installation in pipelines as large as 60 inches in diameter, and since the height of a gate valve is more than twice the pipe diameter, the use of excessievly thick walls may result in a substantial amount of wasted metal. Some pipelines carry fluids at relatively low pressures up to 200 p.s.i., and it would be highly desirable to employ relatively thin gauge material in the manufacture of valves for use in such pipelines, if it were feasible to do so. However, in valve constructions heretofore employed, the wall thicknesses capable of withstanding the lower pressures often are not sufficiently thinner to justify stocking additional valve models for an insignificant saving in material. Moreover, in sandwich type valves wherein a body band is received between two plates with a valve closure disc movable between them, the end wall plates have to be of sufficient thickness in any event to accommodate screws for coupling the valve into a pipeline.

It is, therefore, an object of this invention to provide a valve construction method involving the use of relatively thin sheet or plate metal material, the strength of which is enhanced to increase resistance to internal pressures.

It is a further object of this invention to provide a method of manufacturing a valve utilizing thin sheet or plate metal for considerable portions of the valve components.

In carrying out this invention, I provide a valve body that is formed of two major sections, a lower section of relatively thick material to provide rigidity and to accommodate means for coupling the valve into a pipeline, and an upper section of relatively thin sheet or plate material which has been expanded outward so that the inner surfaces are concave for added strength. The concave upper valve body portion is formed by securing a continuous band, which may be of plate material or a channel member, between and around the edges of two parallel sheets. Then, a rigid restraining member with a rectangular opening is clamped across the resultant enclosure, and fluid under pressure is introduced into the interior to expand the sheets outward, except for the strip across the width which is held by the clamp. In one form of the invention the plates and the body band around them are circular to form a cylindrical enclosure and, according to another form of the invention, they are formed in ovals. In the case of the oval enclosure the clamp may be placed at the mid-portion so that, when the body is severed along the middle of the undeformed strip, two upper valve body sections are formed, each having an undeformed open end, which is thereafter welded around the rectangular opening of a flange. In the case of the circular enclosure the clamp is placed along a chord. The lower body section is formed of relatively thick material, preferably two end walls of plate stock between which is secured a U-shaped body band. A rectangular flange is secured to this body section as well, and the flanges of the two body sections are secured together as by bolting.

Other objects and advantages of this invention will become apparent from the description following when read in conjunction with the accompanying drawings wherein:

FIG. 1 is a front elevation of a gate valve made according to the method of this invention;

FIG. 2 is a vertical section view of the gate valve taken along line 2—2 of FIG. 1;

FIGS. 3 and 4 are top and elevation views, respectively, of an enclosure from which two upper gate valve body sections may be formed;

FIGS. 5 and 6 illustrate different types of welds that may be employed;

FIGS. 7 and 8 are elevation and top views of the enclosure being clamped and exanded;

FIG. 9 is an elevation view of the expanded enclosure with clamp removed;

FIG. 14 is an elevation view of an enclosure from which an upper valve section may be formed in accordance with another embodiment of this invention;

FIG. 15 is a vertical section view taken along line 15—15 of FIG. 14;

FIG. 16 is a front view of an upper valve section completed from the form of FIG. 14;

FIG. 17 is a side view of the upper valve section of FIG. 16;

FIG. 18 is a vertical section of a valve closure disc in an intermediate stage of fabrication;

FIGS. 19 and 20 are vertical sections of alternate embodiments of closure discs formed from the intermediate structure of FIG. 18;

FIGS. 21 and 22 are vertical sections of partially completed valve closure discs formed according to another process of this invention; and FIG. 23 is a vertical section of another form of valve closure disc.

Figure 10:
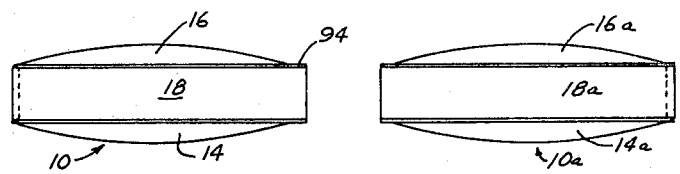
FIG. 10 is an elevation view of the enclosure after it is divided into two upper body sections.

Referring now more particularly to FIGS. 1 and 2, the valve body of this invention comprises an upper body section or bonnet 10 secured to a relatively thicker lower body section 12. The upper body section comprises a pair of opposing end walls 14 and 16 between and around the outer edges of which is secured an inverted U-shaped body band 18, as by welding around the peripheries thereof. Preferably, the end walls are welded around the body band both internally at 20 and externally at 22. The body band is of somewhat thicker gauge than the end walls 14 and 16, and the end walls are expanded outward by a method hereinafter to be described so that the inner surfaces are concave to add increased resistance to bending under internal and external pressures. The lower end 24 of the upper body section is of generally rectangular cross section and is welded to a complementary flange 26.

A valve stem slide bearing 28 including a flange 30 is secured at the top of the body band 18 within an opening 32 to accommodate the valve stem 34 to which is secured a gate disc 36 hereinafter to be described. A seal ring retainer 38 is accommodated within the bearing member and is provided with suitable seal means such as O-rings 40 to effect a seal between the stem and the bearing. A valve operator (not shown) is secured to the flange 30 by means of capscrews 42 passing through a complementary flange 44. Suitable eyes 45 may be welded to the body band 18 to facilitate handling the valve.

The lower body portion 12 is preferably formed by relatively thick metal end plates 46 and 48, each including fluid passage openings 50, and between the end plates 46 and 48 is secured a U-shaped body band 52 which may be sealed as by welding inside and out at 54 and 56. The end plates 46 and 48 are provided with a circular series of tapped holes 58 for attachment to the flange of a pipe section and a generally rectangular flange 60 is welded to the flat upper ends of the end plates 46, 48 and the body band 52.

When assembling the body sections, the complementary flanges 26 and 60 of the upper and lower body sections 10 and 12 are secured together as by means of capscrews 62, and the joint is sealed as by means of an O-ring 64, with some means, such as the thin ring 66 shown, functioning as an O-ring retainer.

The valve closure disc 36 comprises a dished disc 68 which is welded within a rigid seat ring carrier ring 70 having annular recesses 72 in their outer face to accommodate seat rings 74 which seal against complementary working surfaces 76 on the inner surfaces of the end plates 46 and 48. The gate or closure disc 36 is attached to the stem 34 by threaded engagement of the stem within a sleeve 78 that is welded to the top of the seat ring carrier 70. A lock pin 80 is inserted through the sleeve and stem to insure against inadvertent separation.

FIGS. 3 through 13 disclose one method of fabricating the upper valve body section wherein a pair of oval plates 82 are formed of sheet or plate material. As used herein, the terms "sheet" and "plate" are not defined by steel industry standards, but they are general terms meaning a relatively thin, readily expandable member. The plates, then, are welded around their edges to opposite edges of a continuous body band 84 in which an inlet opening 86 has been bored. As shown in FIGS. 5 and 6, the oval plates 82 may be slightly smaller than the body band 84 with the weld material 88a serving to fill the gaps around the edges, or they may be large enough to be supported on the band and the corner filled with weld material 88b, but, in either case, a sealed enclosure 89 is formed. Then, a pair of rigid resistance bars 90 are placed across the mid-portion of the plates, adjacent to or against the sheets 82, as by adjusting the studs 92. Then, a fluid is introduced through the inlet opening 86 at a pressure P sufficient to cause the plates 82 to expand outward, but preferably not sufficient to bend the body band 84 excessively. The resistance bars 90 and the studs 92 resist bending so that, as shown in FIG. 9, a strip 94 across the mid-portion is left relatively undeformed in approximately rectangular cross-section. Thus, the enclosure 89 formed by the oval plates 82 and the body band 84 has two sections wherein the plates 82 are expanded outward near the center of curvature of two arcuate portions of the body band, but it retains approximately its original cross-section at the relatively undeformed mid-strip 94.

Figure 11:
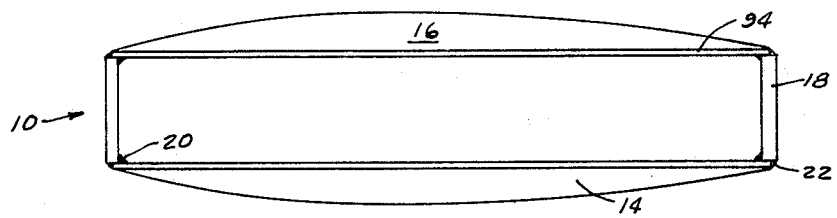
FIG. 11 is an end view looking toward the open end of an upper body section of FIG. 10.
Figure 12:
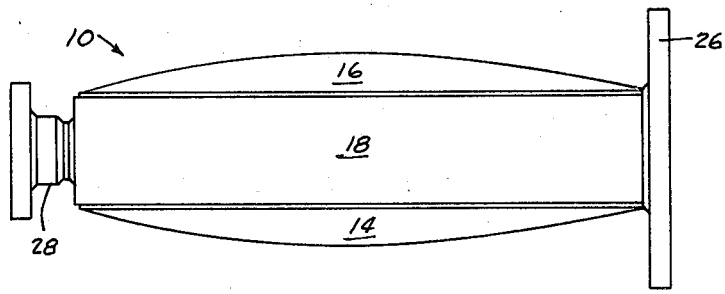
FIGS. 12 and 13 are side and end views of a completed top body section.
Figure 13:
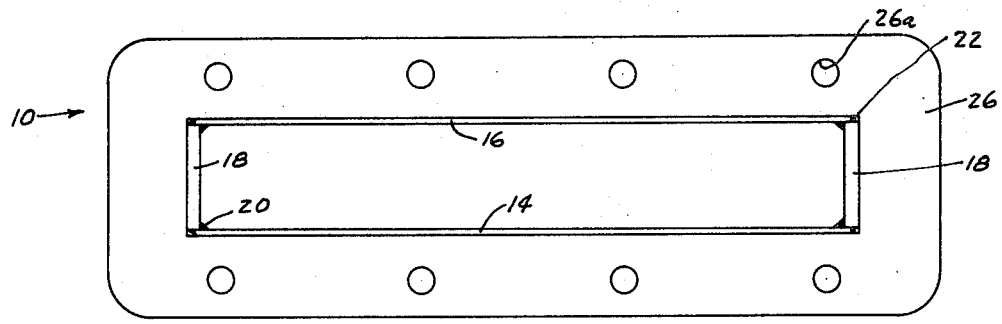

After the enclosure 89 is so expanded under pressure into permanent deformation, it is divided along the line C—C within the undeformed mid-strip 94 to form two separate open end upper valve body portions 10 and 10a having convex outer walls, and, hence, concave inner walls providing added strength and resistance to both internal and external pressures. As shown in FIG. 11, the undeformed strip 94 forms a rectangular open end which is readily adapted for connection to the complementary open end of the lower body member 12. After the enclosure is severed, the inner weld 20 is preferably placed around the deformed plates and body bands for increased strength.

Then, the rectangular flange 26 with bolt holes 26a is welded onto the undeformed portion adapting the upper body portion 10 for connection to the lower body portion, and the body band is bored to receive the valve stem bearing member 28 which is welded into place.

Referring again to FIGS. 1 and 2, the lower body portion is preferably formed by cutting the end walls 46 and 48 from plate metal and welding between them a U-shaped body band 52. The end walls are bored and tapped at 58 for connection to a flanged pipe section, and a rectangular flange 60 is welded to the flat upper end of the plates 46 and 48 and the body band 52. Then, an O-ring 64 and an O-ring retainer 66 are placed between the flanges 26 and 60, and the capscrews 62 are tightened to complete the valve body.

Referring now to FIGS. 14 to 17, I have disclosed another form of upper valve body section and the process of manufacturing such section. With specific reference to FIGS. 14 and 15, the body band is formed by bending a channel 95 into a circular loop and welding the ends together at 95a. Then, a pair of circular discs 96 are welded at 96a around their circumferences to the inner edges of the channel legs 95b. Since the plates 96 are of circular configuration they are easily positioned within the complementary circular edges of the channel legs 95b without precision placement and without regard to relative angular disposition. In addition, since the weld 96a is spaced inward from the outer periphery of the body band 95 it is more accessible. Moreover, when the sheets 96 are expanded outward, as hereafter described, there is less tendency for the sheets 96 to separate from the body band 95, as when sheets are welded to a single strip to form the corner. This is so because the end and side walls tend to separate with a larger angle between them after expansion and when the joint is at the corner, there is appreciable stress exerted on the weld. On the other hand, where the weld is actually within the area of the wall, as in FIG. 14, both elements expand in the same direction and the weld is not under as much stress (FIG. 17).

In completing the upper valve body section, a similar restraining member may be placed over the sheets so that they will not be deformed at the cross-section wherein they are to be attached to a flange. In the alternative, a flange 97 may be welded directly to the body before or after severing along the line D—D in FIG. 14 to serve as the restraining member. If the body is severed first, as shown in FIG. 16, a series of bolts 98 may then be applied to secure the flange 97 to a solid plate 99 with an inlet 99a for pressure fluid as indicated by the arrow P. A diaphragm or other seal 100 will render the structure fluid-tight as the sheets 96 are expanded outward to the configuration shown in FIG. 17. While I have shown alternate embodiments involving a flat body band with oval end plates and a channel body band with circular end plates, it is obvious that the body band types and end plate configurations are interchangeable.

Referring now to FIGS. 18 through 23, I have shown several alternate methods of forming the valve closure discs. First, in FIG. 18, I form rigid ring 101 with spaced internal radial shoulders 102 on which are supported sheet metal discs 104 and welded around their peripheries 106 to form a fluid-tight enclosure between them. Then, through an opening 108 in the support ring, fluid is introduced at a pressure sufficient to cause the discs 104 to expand outward to the configuration shown. Then, from the intermediate configuration shown in FIG. 18, either of two alternate method steps may be followed to produce the structures shown in FIGS. 19 and 20.

In FIG. 19, the opening through which the pressure fluid was introduced is plugged at 110 and the annular faces of the carrier ring are machined to provide annular recesses 112 for the seat rings. At intervals around the recess, spring-retaining holes 114 are bored to receive coil springs which urge the seat rings out into sealing contact. Finally, the threaded sleeve 78 is welded to the outside of the carrier ring adapting it for connection to the valve stem 34.

Alternatively, the carrier ring of FIG. 18 may be cut in a radial plane generally along the line A-B to form two closure discs, each with a single concave disc. The outer ring is then finished to provide a seat ring recess 112 and preferably welded at 113. Then, coupling 78 is welded to the outside to form the structure of FIG. 20.

The structure of FIG. 19 may be further strengthened by applying some reinforcing means between the concave inner surface. For example, the space between the discs could be filled with sand or some other non-compressible substance or, as shown in FIG. 23, a coaxial reinforcing sleeve 118 may be welded between them. In that embodiment, a hole 120 is first cut into one of the discs 104a and the sleeve 118 is inserted and welded at 122 to both discs to form a completely sealed enclosure around the sleeve 118.

The valve discs of FIGS. 21 and 22 are formed in a manner similar to those just described, except that after the discs 124 are welded to the carrier ring 101 or 101a, they are exposed to external pressure as by placing the assembly within a pressure chamber (not shown). Hence, in the closure disc of FIGS. 21 and 22 a concave surface is presented to oppose both upstream and downstream pressures.

If desired in fabricating the valve closure discs, a machine finishing operation may be omitted, as shown in FIG. 22. There, a spacer member 126, which may be a complete ring, is secured as by spot welding between the outer edges of the discs 128. The discs 128 are preferably of smaller diameter than the carrier ring 101a so that close tolerances are not essential and so that a full weld 130 is possible. Then, when the spacer 126 and discs are secured in place, the discs are deformed into dished configuration, as in the other embodiments. In either embodiment of FIGS. 21 and 22, the concave discs themselves may, if desired, be welded together for added strength, as shown at 132.

While I have described this invention in connection with preferred embodiments thereof, it is obvious that modifications and changes therein may be made by those skilled in the art without departing from the spirit and scope of this invention as defined by the claims appended hereto.

Having described my invention, I claim:

1. The method of constructing a valve comprising the steps of:
    forming a pair of generally planar walls having generally curved peripheries from thin metal plates,
    forming a continuous metal band around said walls to form an enclosure with said walls opposing each other and said band between them,
    making said enclosure fluid-tight by peripheral welding, said enclosure being free of welds at the junctions between said walls and said metal band,
    introducing fluid between said walls at sufficient pressure to cause them to expand outward,
    severing said enclosure at a cross-section thereof to form a thin valve body section with an open end,
    forming a complementary body section with opposing end walls of relatively thick material having flow passages therethrough, side walls, and an opening in one end of said complementary body section,
    providing means around said flow passages for connecting said complementary body section into a pipe line, and
    securing said body sections together with the openings therein in communication to form a valve body.

2. The method defined by claim 1 wherein said last-named step is accomplished by:
    welding a flange around the opening in each of said body sections,
    placing a seal between said flanges, and
    securing said flanges together.

3. The method defined by claim 2 including the steps of:
    securing a pair of rigid strength members across said walls and spaced apart corresponding to the width of the opening in the thin body section flange, before introducing fluid therein, to cover a strip around said enclosure,
    said strength members being sufficiently rigid to resist said pressure so that said plates along said strip are relatively undistorted, and
    cutting through said enclosure along said strip to form a generally rectangular opening therein receivable in said thin body section flange.

4. The method defined by claim 3 wherein:
    said generally planar walls are of generally oval configuration,
    said strength members are secured across the width of said enclosure intermediate the arcuate ends thereof, and
    said plates are severed after being expanded outward to form two thin body sections.

5. The method defined by claim 1 wherein:
    said metal band is formed by bending a channel member into a loop, and
    said metal plates are welded to the legs of said channel member.

6. The method defined by claim 5 wherein:
    said channel member metal band is bent into circular form and said metal plates are of circular configuration.

7. The method defined by claim 6 wherein:
    said metal band and plates are severed along a chord before they are distorted,
    a rigid metal flange is welded across the open end of one portion,
    a seal member is applied to close off the opening through said flange, and
    a fluid under pressure is introduced between said plates to expand them outward.

8. The method defined by claim 1 including the additional steps of:
    forming a ring of rigid metal,
    forming a pair of circular discs of relatively thin plate material,
    placing a weld around the edges of said disc to secure them in coaxial relationship to said ring and to seal them therewith,
    exposing corresponding surfaces of said discs to pressure sufficient to deform them axially so that the surfaces so exposed are concave,
    mounting a seal ring on at least one annular surface of said ring,
    mounting valve disc operating means in said valve body, and
    connecting said operating means to said ring so that said ring is movable in a plane intermediate and generally parallel to said end walls.

9. The method defined by claim 8 wherein the pressure is introduced between said discs to deform them outward.

10. The method defined by claim 8 wherein said ring and disc are placed within a pressure chamber so that said pressure is against their outer surfaces so that said outer surfaces are formed concave.

11. The method of making a pressure-resistant disc for a valve body comprising the steps of:
   forming a ring of rigid metal,
   forming a pair of circular discs of relatively thin plate material,
   placing a weld around the edges of said discs to secure them to said ring in coaxial relationship therewith and to seal them therewith,
   exposing corresponding surfaces of said discs to pressure sufficient to deform them axially so that said surfaces so exposed are concave,
   cutting through the cylindrical surfaces of said ring intermediate said disc to form separate pressure-resistant discs, and
   forming seal recesses in at least one face of each of said severed rings.

12. The method defined by claim 11 wherein the pressure is introduced between said discs to deform them outward.

13. The method defined by claim 11 wherein said ring and discs are placed within a pressure chamber so that said pressure is exposed to their outer surfaces so that said outer surfaces are made concave.

References Cited

UNITED STATES PATENTS

| | | | |
|---|---|---|---|
| 1,216,733 | 2/1917 | Rowland | 29—421 |
| 2,106,496 | 1/1938 | Debor | 29—421 |
| 2,715,377 | 8/1955 | Gary | 29—412 |
| 2,891,762 | 6/1959 | Kellogg | 251—329 |
| 3,151,838 | 10/1964 | Tripoli et al. | 29—157.1 X |
| 3,239,921 | 3/1966 | Grove | 29—157.1 |
| 3,331,118 | 7/1967 | Grove | 29—157.1 |

JOHN F. CAMPBELL, *Primary Examiner.*

R. B. LAZARUS, *Assistant Examiner.*